US 8,641,995 B2

(12) United States Patent
Garay et al.

(10) Patent No.: US 8,641,995 B2
(45) Date of Patent: Feb. 4, 2014

(54) MAGNETO-OPTIC NANOCRYSTALLINE OXIDES AND METHODS OF FORMING THE SAME

(75) Inventors: Javier E. Garay, Laguna Beach, CA (US); Jason R. Morales, Riverside, CA (US)

(73) Assignee: The Regents of the University of California, Oakland, CA (US)

(*) Notice: Subject to any disclaimer, the term of this patent is extended or adjusted under 35 U.S.C. 154(b) by 168 days.

(21) Appl. No.: 13/221,738

(22) Filed: Aug. 30, 2011

(65) Prior Publication Data

US 2012/0076712 A1 Mar. 29, 2012

Related U.S. Application Data

(60) Provisional application No. 61/378,092, filed on Aug. 30, 2010.

(51) Int. Cl.
*C01F 17/00* (2006.01)
(52) U.S. Cl.
USPC ............................ 423/263; 264/104; 977/775
(58) Field of Classification Search
USPC ........... 423/263; 977/773, 775–778; 264/109, 264/104
See application file for complete search history.

(56) References Cited

U.S. PATENT DOCUMENTS 7,867,463 B2 * 1/2011 Hyeon et al. .................. 423/263

OTHER PUBLICATIONS

Anselmi-Tamburini et al. "Fast low-temperature consolidation of bulk nanometric ceramic materials". Scripta Materialia. vol. 54, Issue 5, Mar. 2006, pp. 823-828.*
Paranosenkov, V.P. et al. "Preparation of Dense Ceramics Based on Silicon Nitride Nanopowders" Refractories and Industrial Ceramics. 44 (4) 2003.*

* cited by examiner

*Primary Examiner* — Stanley Silverman
*Assistant Examiner* — Richard M Rump
(74) *Attorney, Agent, or Firm* — Knobbe, Martens, Olson & Bear, LLP

(57) ABSTRACT

Rare earth magneto-optical nanocrystalline oxides provide a material that is transparent in the visible range and has a high magnetic response to external magnetic fields. The material can be manufactured using current activated pressure assisted densification (CAPAD). The result is a rare earth magneto-optical nanocrystalline oxide having an average grain size of less than about 100 nm and a Verdet constant greater than or equal to about 300 rad $T^{-1}$ $m^{-1}$ for light having a wavelength of about 632.8 nm.

28 Claims, 9 Drawing Sheets

MAGNETO-OPTIC NANOCRYSTALLINE OXIDES AND METHODS OF FORMING THE SAME

PRIORITY CLAIM

This application claims the benefit under 35 U.S.C. §119(e) of U.S. Provisional Patent Application No. 61/378,092 filed Aug. 30, 2010, which is hereby incorporated by reference in its entirety.

STATEMENT REGARDING FEDERALLY SPONSORED R&D

Embodiments of the present disclosure were made with Government Support under contract number FA9550-09-0197 awarded by the Air Force Office of Scientific Research (AFOSR). The Government has certain rights in this invention.

BACKGROUND

1. Field

Embodiments of the invention relate to oxides, and more particularly, to rare earth magneto-optical nanocrystalline oxides.

2. Description of the Related Technology

Magneto-optical materials can be useful in a variety of applications, including, for example, communications and optical systems, e.g., optical diodes. However, materials that possess both excellent magnetic proprieties and which are transparent to visible light can be very rare. For example, materials having useable magnetic properties can require the existence of free electrons, which can absorb light efficiently. Thus, relatively few materials have both high magnetic susceptibility and transparency to visible light.

Additionally, the production of rare earth oxides has been limited by processing technology. For example, single crystal oxide materials have been produced using melt processes, such as flux growth. However single crystal growth can be a relatively time consuming process. Furthermore, certain oxide compositions cannot be grown from a melt. Alternatively, oxide powders can be densified to produce optically transparent polycrystalline oxides. However, in practice polycrystalline oxides made using conventional densification processes have a high residual porosity, which can increase light scattering and can result in optically opaque oxides. Additionally, conventional ceramic processing methods, such as hot pressing, can require long processing times and high temperatures to produce porosity sufficient for optically transparent ceramics. High temperatures can lead to breakdown of nanocrystalline structures, and thus conventional ceramic processing methods can be unsuitable for making rare earth oxides.

There is a need for magneto-optic materials having a nanocrystalline structure, a high crystal density, a high magnetic susceptibility, and transparency to visible light. Furthermore, there is a need for magneto-optical device manufacturing processes having reduced processing times and improved temperature control.

DETAILED DESCRIPTION

Densification of rare earth oxides can be relative complex compared to densifying other oxides, since rare earth oxides can undergo changes in crystal structure at elevated temperatures and can be sensitive to porosity. Thus, rare earth oxides should be processed at temperatures lower than their phase transition and densified to near full densities to minimize light scattering by pores. To reduce processing times while retaining nanocrystalline grains, which can increase effective light transmission for wavelengths of visible light, current assisted methods and processes have been explored. However, most work directed toward nanocrystalline grains has been based on alumina and zirconia, and magneto-optical oxides have received little attention. It can be difficult to produce transparent rare earth oxides using conventional methods, and hence there is a need for improved methods of making magneto-optical nanocrystalline oxides.

Oxide materials having improved optical and magnetic properties are disclosed herein. The materials can be made by densifying rare earth nanocrystalline powder into relatively large-sized bodies using electric current activated pressure assisted densification (CAPAD) techniques. By applying both current and pressure, a nanocrystalline structure can be retained, thereby providing optical transparency to the polycrystalline materials.

Materials that have a high magnetic response to external magnetic fields and transparency in the visible range are extremely rare. For example, permanent magnets are usually opaque due to their narrow (or lack of) bandgap, and optically transparent materials are usually weak paramagnets. However, the rare earth elements Dy, Tb, and Ho can be some of the most magnetically active elements, and oxides, in turn, often have wide bandgaps allowing for light transmission in the visible range. To achieve a combination of high magnetic susceptibility and transparency to visible light, certain rare earth elements or lanthanides are employed, including, for example, Dy, Tb and Ho. The methods used herein are applicable to oxides having high relatively magnetic moments, such as holmium oxide ($Ho_2O_3$), terbium oxide ($Tb_4O_7$) and dysprosium oxide ($Dy_2O_3$). However, skilled artisans will appreciate that any suitable material can be used with the methods described herein.

Figure 1A:
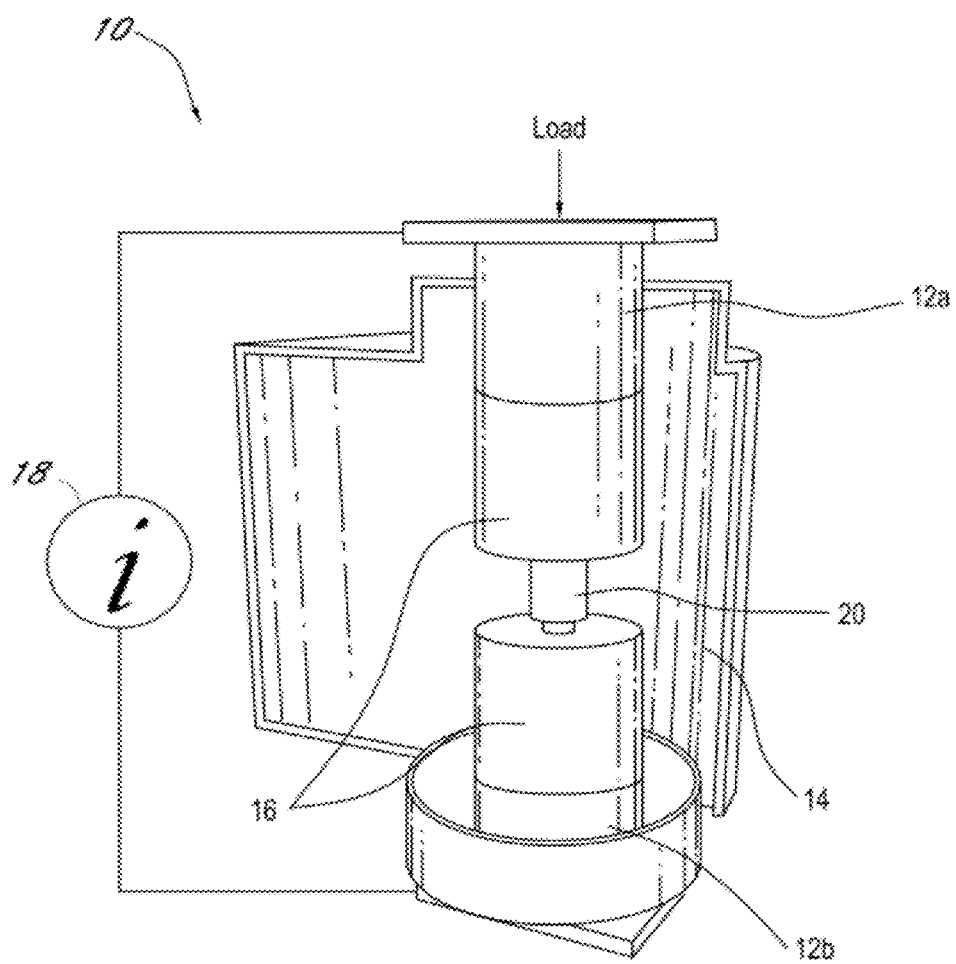
FIG. 1A is a perspective view of a current activated pressure assisted densification (CAPAD) device in accordance with one embodiment.

FIG. 1A is a perspective view of a current activated pressure assisted densification (CAPAD) device 10 in accordance with one embodiment. The CAPAD device 10 includes electrodes 12a-12b, a vacuum chamber 14, spacers 16 and a current source 18.

A sample 20 can be placed within the vacuum chamber 14, and a load can be applied to the device 10 so as to apply a selected pressure to the sample 20. For example, the applied load and the load application rate can be selectively controlled so as to apply a desired pressure to the sample 20. The range of pressure that the device 10 can apply can vary depending on application and machine design, and can be, for example, a pressure in the range of about 0 MPa to about 500 MPa. The vacuum chamber can have a cooling mechanism, such as a water-based cooling system.

The current source 18 can be electrically connected between electrodes 12a-12b so as to deliver a current to the sample 20. The current source 18 can deliver a variety of current waveforms, such as, for example, DC, DC pulsed, square, saw-tooth, and sinusoidal waveforms. The current source 18 can be programmed to deliver a waveform of a particular frequency and/or amplitude. The amplitude of current can range, for example, between about 0 Å and about 4000 A. Spacers 16 can be included to space the sample 20 from electrodes 12a-12b.

Although not illustrated in FIG. 1A, the device 10 can include additional functionality, such as data acquisition and measurement capabilities.

CAPAD manufacturing techniques can have a relatively tight degree of temperature control, thereby permitting the processing of rare earth powders at intermediate temperatures where a relatively high nanocrystal density can be achieved, and below phase change temperatures in which light transparency can be destroyed. Thus, magneto-optic materials having a transparency to light in the visible spectrum and which have a very high magnetic susceptibility can be readily obtained using CAPAD techniques. Additionally, CAPAD techniques permit materials to be processed in relatively short times, such as times less than about 20 minutes.

CAPAD techniques can include simultaneous application of high current densities and pressures as an oxide is processed for a desired temperature and time. The current can heat a sample by Joule heating without employing a spark, which can aid in enhancing temperature control relative to conventional designs. The improved temperature control can result in very high heating and cooling rates and well-controlled temperature uniformity in the oxide. Thus, CAPAD processes can avoid overheating the rare earth oxide and avoid nanocrystalline breakdown mechanisms associated with relatively high temperatures.

Additionally, without being limited by theory, it is believed that the current delivered in the CAPAD process provides benefits beyond temperature control. For example, the high current flux can develop plasma in the inter-powder regions of the sample, thereby enhancing mass reactivity. Furthermore, the defect mobility energy can be decreased under the exposure to current. Moreover, it is believed that electrons in the current delivered by the CAPAD process can assist in mass transport by imparting momentum to the sample.

The pressure applied in the CAPAD process can aid in densification of rare earth powders. For example, the applied pressure can increase the surface energy driving force and can affect the densification mechanism of the oxide. Consolidating materials to full density while keeping the grain size relatively small requires low temperatures and short holding times. Due to the combination of the current effects and applied pressure, the technique described herein has proven effective in significantly lowering the processing temperature required for consolidating rare earth powders to relatively high densities. Because decreasing the processing temperature can be important for the retention of a nanocrystalline microstructure, the current activated pressure assisted densification method can be beneficial for fabricating nanoceramics.

Figure 1B:
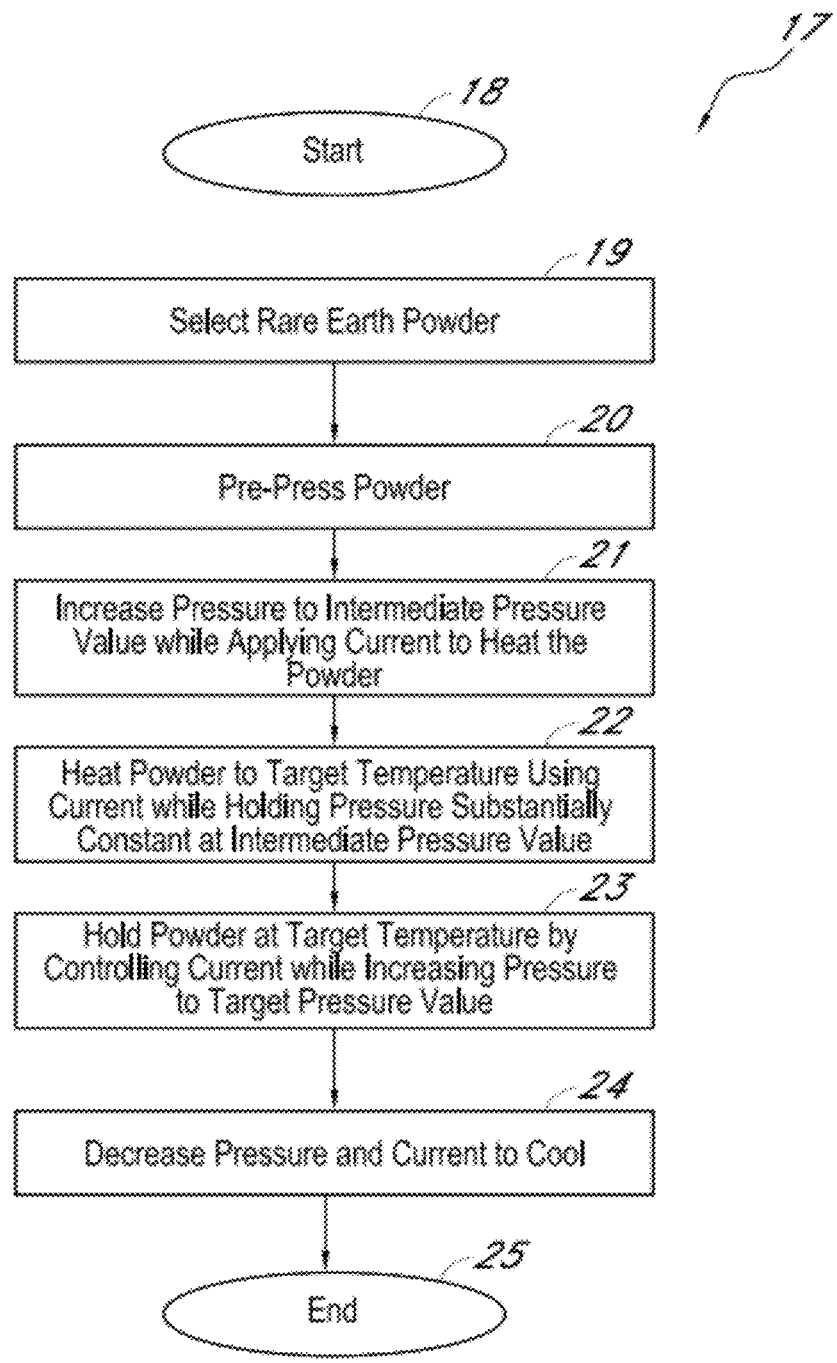
FIG. 1B is a method of making a rare earth oxide in accordance with one embodiment.

FIG. 1B is a method 17 of making an oxide in accordance with one embodiment. It will be understood that the methods discussed herein may include greater or fewer operations and the operations may be performed in any order, as necessary. The illustrated method can be used to manufacture magneto-optic nanocrystalline oxides.

The method 17 begins at 18. In an ensuing block 19, a rare earth powder is selected. The rare earth powder can comprise a lanthanide, such as Dy, Tb and Ho. In one embodiment, the rare earth powder comprises at least one of holmium oxide ($Ho_2O_3$), terbium oxide ($Tb_4O_7$) and dysprosium oxide ($Dy_2O_3$). The rare earth powder can be a composite, such as, for example, a composite of holmium oxide and terbium oxide. Skilled artisans will appreciate that other rare earth powders can be used with the methods described herein.

The rare earth oxide powder can be poured into a CAPAD device, such as the CAPAD device 10 of FIG. 1A. In one embodiment, the powder is poured into a die, such as, for example, a graphite die, and the die and powder are positioned within the CAPAD device.

In an ensuing block 20, the rare earth powder is pre-pressed. Pre-pressing the powder can include increasing the pressure to a pressure ranging between about 10 percent to about 100 percent the target pressure, for example, about 50 percent the target pressure. The target pressure can be in the range of about 50 to about 150 MPa, for example about 140 MPa, as will be described below. The rate at which the pressure can increase can be in the range of about 10 MPa/min to about 1700 MPa/min, and the pre-press can take place at a temperature within about 200° C. of room temperature. Thus, the current can be relatively low or completely off during the pre-press of block 20. Once the pre-press pressure is reached, the pressure can be held substantially constant, for a period of time ranging between about 1 to about 10 minutes, for example, about 1 minute. The pressure can then be reduced to a relatively low pressure, such as a pressure of about 0 MPa, and the sample can be rested for about 1 to about 10 minutes. However, in certain embodiments, the sample is not rested.

In an ensuing block 21, the pressure applied to the powder can be increased to an intermediate pressure while applying a current to heat the powder. The intermediate pressure can be about 50 percent to about 100 percent the target pressure, for example, about 75 percent the target pressure, and the rate at which the pressure can increase can be in the range of about 1 MPa/min to about 1700 MPa/min, for example about 35 MPa/min. The intermediate pressure can be in the range of about 25 to about 125 MPa, for example, about 106 MPa. While the pressure is being applied, a current can be applied to the sample to control the rate of heating to be in the range of about 10° C./min to about 1000° C./min, for example, about 60° C./min.

The method 17 continues to a block 22, in which the powder is heated to a target temperature using current while the pressure is held substantially constant at the intermediate pressure. Thus, the pressure can be controlled at the intermediate pressure reached in block 21, while the current is controlled to heat the sample to a target temperature using a desired heating rate. In one embodiment, the target temperature of the sample ranges between about 900° C. to about 1400° C., for example, about 1200° C., and the heating rate ranges between about 50° C./min to about 500° C./min, for example, about 200° C./min.

In an ensuing block 23, the current is controlled to keep the temperature of the powder substantially equal to the target temperature, and the pressure is increased to the target pressure. The target pressure can be in the range of about 50 to about 150 MPa, for example about 140 MPa, and the pressure can increase at a rate of about 1 MPa/min to about 1700 MPa/min. During the block 23, the resistance of the sample can decrease, which can result in the current being increased to maintain the temperature equal to about the target temperature. Once the target pressure has been reached, the sample may be held at the target pressure and target current for a period of time ranging between about 1 to about 60 minutes, for example, about 4 minutes. However, in certain embodiments, the sample is not held at the target pressure and target current.

The method 17 of FIG. 1B continues at a block 24, in which the pressure and current are decreased to achieve a desired cooling rate. The cooling rate can be selected from a rate ranging between about 10° C./min to about 1000° C./min, for example, about 130° C./min. After the sample has cooled, the sample can be removed from the CAPAD chamber and extracted from the die. The method 17 ends at 25.

Figure 1C:
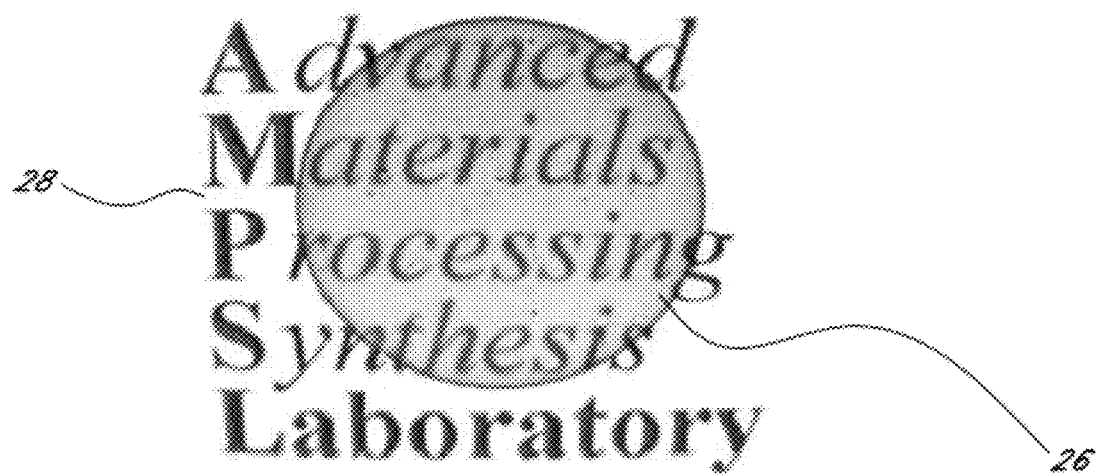
FIG. 1C is a plan view of a sample processed using the method of FIG. 1B positioned over a paper sheet having text.

FIG. 1C is a plan view of a sample 26 processed using the method of FIG. 1B positioned over a paper sheet 28 having text. The sample 26 is about 0.64 mm thick and about 19 mm in diameter. The sample 26 was processed from nanocrystalline $Dy_2O_3$ powder available from MTI Corporation and has a reported crystallite size of about 40 nm.

The powder used to make the sample 26 was pre-pressed at 71 MPa for about 1 minute. Thereafter, the pressure was reduced to about 0 MPa, and the powder was rested for about 1 minute. A current was then applied to the powder so as to increase the temperature at a rate of about 60° C./min, while the pressure increased at a rate of about 35.3 MPa/min until the pressure reached about 106 MPa. The time for the pressure to change from about 0 MPa to about 106 Mpa was about three minutes. Next, while holding the pressure substantially constant at the intermediate pressure of about 106 MPa, the sample was heated by applying current so as to maintain a heating rate of about 200° C./min. The sample was heated until the target temperature of about 1100° C. was reached. Thereafter, the temperature was held substantially constant at the target temperature while the pressure was ramped over about 1 minute from the intermediate pressure of about 106 MPa to the target pressure of about 141 MPa. The sample was held at the target temperature of about 1100° C. and the target pressure of about 141 MPa for about 4 minutes. The sample was then cooled at an average cooling rate equal to about 130° C./min. The sample 26 was processed in less than about 20 minutes.

After processing, the sample 26 was polished metallographically down using 1200 grit SiC polishing paper. Thereafter, the sample 26 was polished using slurry erosion with 500 nm $Al_2O_3$. As shown in FIG. 1C, the lettering of the paper sheet 28 is clearly visible through the sample 26, thus demonstrating the transparency of the sample 26.

Figure 1D:
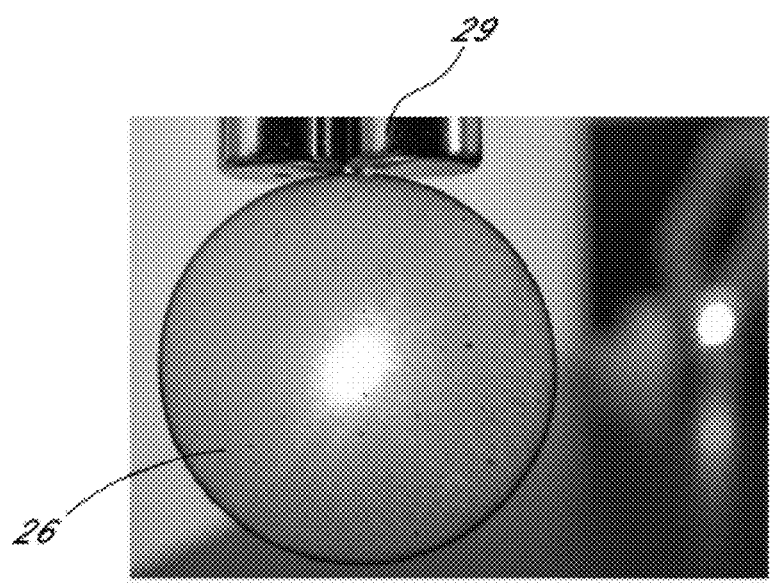
FIG. 1D is a perspective view of the sample of FIG. 1C suspended from a permanent magnet and illuminated by a laser beam.

FIG. 1D is a perspective view of the sample 26 of FIG. 1C suspended from a permanent magnet 29 and illuminated by a laser beam. As shown in FIG. 1D, the sample 26 can be suspended by the magnet 29. Thus, the sample 26 can have a relatively high magnetic susceptibility, as will be described in detail below with respect to FIG. 4. Additionally, the sample 29 can be transparent to light, and can be illuminated by a laser beam.

Figure 2A:
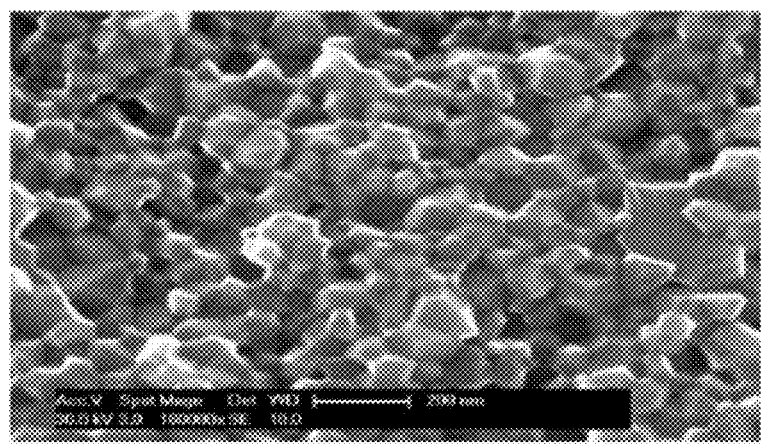
FIG. 2A is a scanning electron microscopy (SEM) micrograph of a fracture surface of a $Dy_2O_3$ sample processed at 1100° C. showing nanocrystalline grains.

FIG. 2A is a scanning electron microscopy (SEM) micrograph of a fracture surface of a $Dy_2O_3$ sample showing nanocrystalline grains. The microstructure of the sample shown in the micrograph of FIG. 2A demonstrates that the crystallite size of the dense transparent polycrystalline material can be in the nanometer regime, such as a size less than about 100 nm.

Figure 2B:
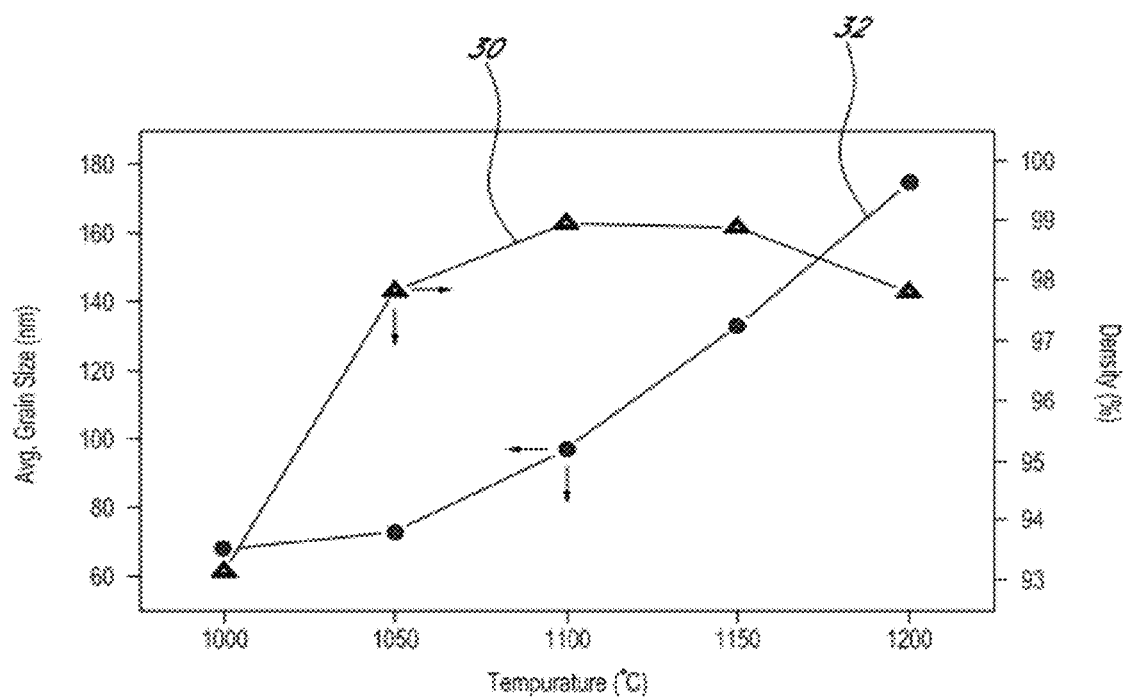
FIG. 2B is a graph of measured average grain size and density of $Dy_2O_3$ samples versus target processing temperature.

FIG. 2B is a graph of measured average grain size and density of $Dy_2O_3$ samples versus processing temperature. The graph includes a plot 30 of measured density versus processing temperature and a plot 32 of measured average grain size versus processing temperature. After densification, the microstructure of the materials was characterized using scanning electron microscopy (SEM) and x-ray diffraction (XRD). Sample densities were measured using the Archimedes method with deionized water as a medium. SEM micrographs were taken using Philips FEG30, and the average grain sizes were calculated from SEM images. The grain sizes in FIG. 2B are averages based on at least 500 grains measured across a plurality of SEM images.

As shown in plot 30, the density can increase significantly when target temperature increases from about 1000° C. to about 1050° C. Additionally, the density can continue to increase when processed at a target temperature of about 1100° C. The density can fall slightly when processed at a target temperature of about 1200° C. Without being limited by theory, it is believed that the decrease in measured density after 1100° C. results from phase change of the sample, as will be discussed below with reference to FIG. 3. Nanocrystallinity can be retained because of the relatively low temperatures.

Plot 32 demonstrates that average grain size of the materials can increase with temperature. At target temperatures at or below about 1100° C., the materials are nanocrystalline and can have grain sizes below 100 nm. Nanocrystallinity can be retained because the processing time of the sample is relatively short, such as less than 20 minutes. Processing times using CAPAD methods can be short relative to conventional processing times to densify rare earth oxides, which can be on the order of hours to days. Longer processing times can increase fabrication cost and can destroy nanocrystallinity.

Figure 3:
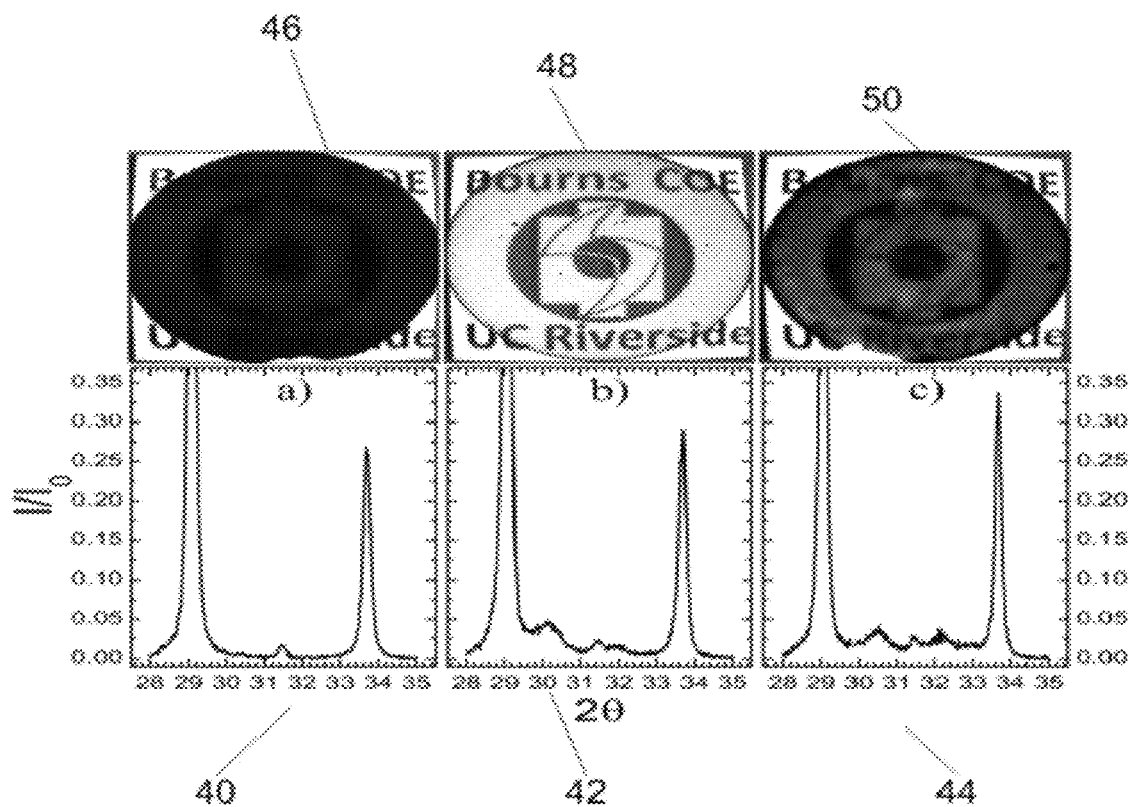
FIG. 3 illustrates three plots of X-ray transmittance versus twice the angle of diffraction for three examples of processed samples.

FIG. 3 illustrates three plots of X-ray transmittance versus twice the angle of diffraction for three examples of processed samples. The plots were measured using X-ray diffraction, and the first plot 40 corresponds to a $Dy_2O_3$ sample processed at a target temperature of about 1000° C., the second plot 42 corresponds to a $Dy_2O_3$ sample processed at a target temperature of about 1100° C. (such as the sample 26 of FIGS. 1C-1D), and the third plot 44 corresponds to a $Dy_2O_3$ sample processed at a target temperature of about 1200° C. FIG. 3 also includes plan views 46, 48 and 50 corresponding to the samples of plots 40, 42 and 44, respectively. The plan views are similar to the plan view of FIG. 1C described above. The X-ray diffraction data was collected using a Bruker D8 Advance x-ray diffractometer. Data was collected using Cu—Kα at about a 0.02° step size and about a 1 second per step duration.

The first plot 40 includes only peaks from cubic symmetry, while the second plot 42 begins to show peaks from hexagonal symmetry. Additionally, the third plot 44 includes second phase peaks that are better defined, which can indicate a phase change in crystal structure of the sample. Previous work on dysprosia has shown phase changes which occur at significantly higher temperatures than that observed in FIG. 3. Without being limited by theory, it is believed that the difference in phase change is related to oxide partial pressure and/or oxide impurities.

The plan views of FIG. 3 show that the affect of the second phase on the optical properties can be relatively dramatic. For example, the plan view 48 corresponding to the sample produced at a target temperature of about 1100° C. can be transparent, while the plan view 50 corresponding to the sample produced at a target temperature of about 1200° C. can be translucent. The change in optical visibility between plan views 48, 50 can be caused increased light scattering resulting form partial phase change of the samples. The increased light scattering in the sample of plan view 50 demonstrates that the selection of processing temperature can be important.

Figure 4A:
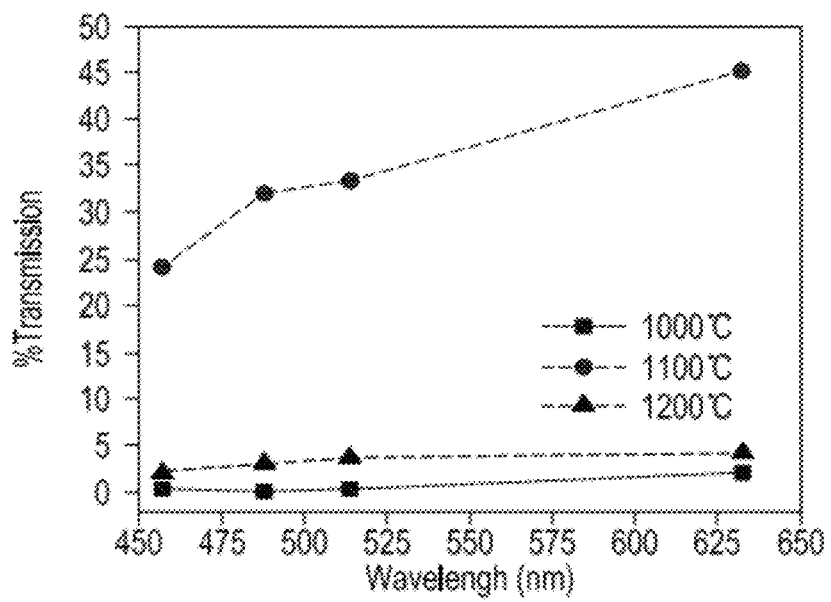
FIG. 4A is a graph of the percent transmission of light versus the wavelength for three samples processed at different temperatures.
Figure 4B:
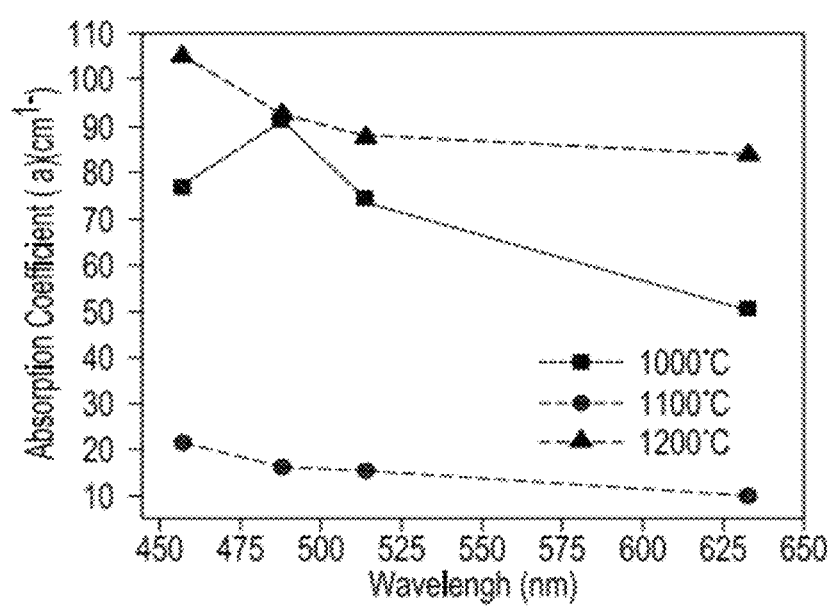
FIG. 4B is a graph of absorption coefficient versus wavelength for three samples processed at different temperatures.

FIGS. 4A and 4B shows the effects more quantitatively of the processing temperature on the optical properties. FIG. 4A plots the percent transmission of light versus wavelength (in the visible range) for samples processed at three different temperatures. FIG. 4B plots the absorption coefficient versus wavelength (in the visible range) for samples processed at three different temperatures. The intensity of light transmitted through the sample, $I_T$, was measured using a photodiode in contact with the sample using varying wavelengths. The absorption coefficients, $\beta$, were calculated using the equation $I_T/I_O=(1-R^2)e^{-\beta 1}$, where $R=[(n-1)/(n+1)]^2$. $I_O$ is the incident light, R is the reflectance, and n is the refractive index. The absorption coefficients were calculated using a refractive index n=2.

The transmission data in FIG. 4A shows significant transmission in the visible range for the sample processed at 1100° C., whereas the other two samples are significantly less transparent. The absorption coefficient of the 1200° C. sample in FIG. 4B is about nine times higher than that of the most transparent sample (1100° C.) at 632.8 nm.

Figure 5:
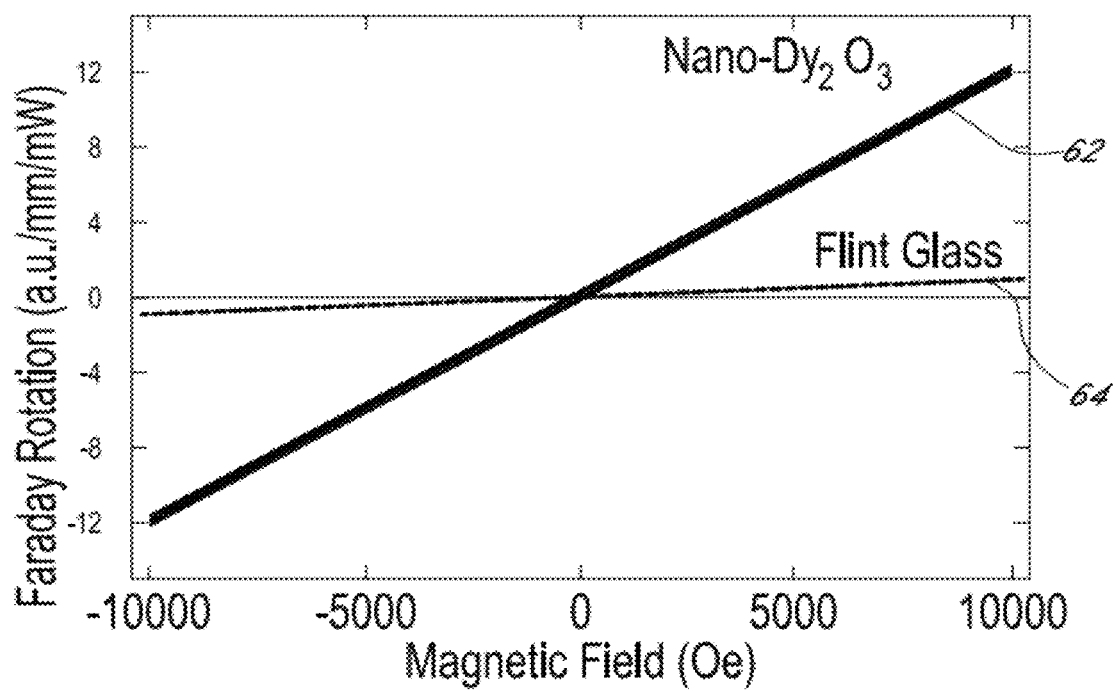
FIG. 5 is a graph of Faraday rotation versus magnetic field for flint glass and for one example of a sample processed at 1100° C.

FIG. 5 is a graph of Faraday rotation versus magnetic field for flint glass and for the processed sample of FIGS. 1C-1D. The plot 62 corresponds to the Faraday rotation versus magnetic field for the processed sample and the plot 64 corresponds to the Faraday rotation versus magnetic field for flint glass. The processed sample is a 0.64 mm thick $Dy_2O_3$ sample, and the flint glass (Schott SF-57) is 0.49 mm thick.

Persons of ordinary skill in the art will appreciate that Faraday rotations describes the rotation of light travelling in a medium under the influence of an applied magnetic field. In particular, Faraday rotation describes the angle of rotation of the plane of polarization of the light relative to the intensity of the applied magnetic field along the direction of propagation of the light. The strength of Faraday rotation can be described using the Verdet constant. This relationship can be expressed using Equation 1 below, where $\theta$ is the angle of rotation, V is a material constant called the Verdet constant, H is the magnetic field and l is the thickness of the material $$\Theta=VHl \quad \quad \text{Equation 1}$$

With reference to Equation 1 above, an increase in the Verdet constant permits a material to be thinner to achieve a certain rotation for a given magnetic field. Likewise, an increase in the Verdet constant permits a reduction in the applied magnetic field needed to achieve a particular optical rotation. High magnetic fields can require bulky electromagnets having permanent infrastructure, such as water cooling and power lines. Decreasing the magnetic field may permit the use of inexpensive permanent magnets, thereby decreasing the total size and weight of a device significantly. Thus, materials with very high Verdet constants can be employed in relatively smaller, cheaper and more portable devices.

The Verdet constant of the processed material is significantly greater than that exhibited by flint glass. For example, the slope of the plot 62 corresponding to the processed sample, and therefore the Verdet constant, is about 15 times greater slope of the plot 64 corresponding to flint glass for light having a wavelength of about 632.8 nm.

Two measurement techniques were utilized in order to verify the Verdet constant of the processed sample. The first technique entailed the transmission of linearly polarized light at an angle of about 0° through the sample and then cross-polarizing the light with another polarizer (the analyzer) at about 90°. A power meter was used to accurately determine the cross polarization angle of the analyzer. The analyzer was mounted on a rotating stage with sub-1° accuracy. After a magnetic field of about 1.8 T was applied to the sample, the analyzer was rotated until about a minimum power of the transmitted light was detected by the power meter. The change in the analyzer's angle was noted as the Faraday rotation for the applied magnetic field. The Verdet constant was then calculated using Equation 1 above.

The second approach was conducted using the Photoelastic Modulator (PEM)-based Focused Magneto-Optical Faraday Effect system. For this analysis, commercially available flint glass with a known Verdet constant was measured with the same parameters as the new material. The measurements were then normalized to the initial power, corresponding to a magnetic field of about 0 T, at the detector's side and to the thickness of each specimen. Since flint glass is diamagnetic while the processed material is paramagnetic, a phase shift of 180° was applied to the flint glass measurements to facilitate a direct comparison between the two specimens. A linear function was fitted for each graph and the Verdet constant was extrapolated based on the slope difference between the new material and the flint glass. FIG. 5 shows the results of the second approach.

In both setups, linearly polarized light with a wavelength of about 632.8 nm was initially focused by a long-range (about 250 mm) focusing lens on the sample. The transmitted light was then collected via an infinity-corrected objective with numerical aperture of about 0.35. The objective was suspended in air inside the exit pole of the electromagnet. The pole's soft magnetic material screened the objective from the adverse effect of the parasitic Faraday rotation.

The Verdet constant of the processed sample is equal to about 300 rad T$^{-1}$ m$^{-1}$ for light having a wavelength of about 632.8 nm. This measured Verdet constant is about 2.25 times higher than that of $Tb_3Ga_5O_{12}$, known to skilled artisans as terbium gallium garnet (TGG), and which is a state of the art material for Faraday elements of a single crystal oxide. Table I compares the Verdet constants of several optically transparent materials with the nanocrystalline rare earth oxide sample. The light rotation caused by orthoferrites is also shown for comparison. The Verdet constant of the nanocrystalline $Dy_2O_3$ is a high value for a large, thick material that is transparent in the full optical range.

TABLE 1

| Material | Verdet Constant (V) (rad/(T m)) | | Rotation Angle ($\theta_R$) (rad/m) | Absorption Coefficient ($\alpha$) ($cm^{-1}$) | | Mechanism |
|---|---|---|---|---|---|---|
| | $\lambda = 632.8$ nm | $\lambda = 514$ nm | $\lambda = 630$ nm | $\lambda = 632.8$ nm | $\lambda = 514$ nm | |
| Flint Glass | +20 | +35 | | 0.002 | | Faraday |
| TGG | −134 | −204 | | $10^{-3}$ | $10^{-3}$ | Faraday |
| Nano-$Dy_2O_3$ | −300 ± 5% | −407 | | 10.1 | 15.6 | Faraday |
| Orthoferrites | | | −1720 to −2290 | | | Elliptic Birefringence |

Even though orthoferrites can induce large light rotations, the phenomena by which orthoferrites rotate light are fundamentally different from other materials. Orthoferrites cause light rotation by the combined effects of the intrinsic magnetic field due to weak ferromagnetism and, more important, elliptic birefringence. Optimal polarized light rotation is gained through the stacking of crystals with tightly controlled thicknesses. The fine control required to produce exact crystal dimensions and the lack of flexibility in the degree of rotation has limited orthoferrite use in devices. In addition, orthoferrites are not transparent in the whole visible spectrum (less than about 600 nm), so they can be used in only a small portion of the visible spectrum.

In contrast, the light rotation of nano-$Dy_2O_3$ occurs via the linear Faraday effect, with which the angle of rotation is linearly dependent on the applied magnetic field. Because our nano-$Dy_2O_3$ has a reliable Verdet constant and is transparent in the entire visible range, it can be easily integrated into devices such as optical isolators.

Without being limited by theory, it is believed that the higher Verdet constant of nano-$Dy_2O_3$ relative to TGG can be based on effective magnetic moments of the two structures. In both materials virtually all of the magnetic properties are contributed by the rare earth ion, and $Dy_3+$ has an effective magnetic moment of 10.63 mB, while $Tb_3+$ has an effective magnetic moment of about 9.72 mB. Since there are 32 Dy ions per unit cell of $Dy_2O_3$ and the unit cell volume is about 1214.77 $Å^3$, the effective magnetic moment for the $Dy_2O_3$ structure is about 0.280 $mB/Å^3$. In contrast, TGG has 24 Tb ions in a volume of about 1879.08 $Å^3$, yielding a total moment of about 0.124 $mB/Å^3$. Thus, nano-$Dy_2O_3$ can have a relatively greater effective magnetic moment relative to TGG.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings.

What is claimed is:

1. A method of making a magneto-optical oxide, comprising:
   providing a rare earth oxide powder;
   increasing a pressure of the rare earth oxide powder to an intermediate pressure while heating the rare earth oxide powder using an electrical current;
   holding the pressure of the rare earth oxide powder substantially at the intermediate pressure while heating the rare earth powder to a target temperature using the electrical current; and
   increasing the pressure of the rare earth oxide powder from the intermediate pressure to a target pressure while holding a temperature of the rare earth powder substantially at the target temperature using the electrical current wherein the target pressure value is a pressure ranging between about 50 MPa to about 150 MPa.

2. The method of claim 1, wherein the rare earth oxide powder comprises at least one of Dy, Tb and Ho.

3. The method of claim 1, wherein the rare earth oxide powder comprises holmium oxide ($Ho_2O_3$).

4. The method of claim 1, wherein the rare earth oxide powder comprises terbium oxide ($Tb_4O_7$).

5. The method of claim 1, wherein the rare earth oxide powder comprises dysprosium oxide ($Dy_2O_3$).

6. The method of claim 1, wherein the target temperature is a temperature ranging between about 900° C. to about 1400° C.

7. The method of claim 1, wherein increasing the pressure of the rare earth oxide powder to the intermediate pressure while heating the rare earth oxide powder using the electrical current comprises heating the rare earth oxide powder at a rate ranging between about 10° C./min to about 1000° C./min.

8. The method of claim 1, wherein the intermediate pressure value ranges between about 50 percent to about 100 percent the target pressure value.

9. The method of claim 1, further comprising pre-pressing the rare earth oxide powder before increasing the pressure of the rare earth oxide powder to the intermediate pressure value.

10. The method of claim 9, wherein the rare earth oxide powder is pre-pressed to a pressure ranging between about 10 percent to about 100 percent the target pressure.

11. The method of claim 9, wherein the rare earth oxide powder is rested for a duration ranging between about 1 min to about 10 min before increasing the pressure of the rare earth oxide powder to the intermediate pressure.

12. The method of claim 1, wherein the oxide has a Verdet constant greater than or equal to about 300 rad $T^{-1}$ $m^{-1}$ for light having a wavelength of about 632.8 nm.

13. The method of claim 1, wherein holding the pressure of the rare earth oxide powder substantially at the intermediate pressure while heating the rare earth powder to the target temperature using the electrical current comprises heating the rare earth oxide powder at a rate ranging between about 10° C./min to about 1000° C./min.

14. The method of claim 1, wherein increasing the pressure of the rare earth oxide powder from the intermediate pressure to the target pressure while holding a temperature of the rare earth powder substantially at the target temperature using the electrical current comprises increasing the pressure at a rate of about 1 MPa/min to about 1700 MPa/min.

15. The method of claim 1, further comprising holding the rare earth oxide powder substantially at the target temperature and the target pressure for a duration ranging between about 1 min to about 60 min.

16. The method of claim 1, wherein the oxide is formed in less than about 20 minutes.

17. The method of claim 1, wherein the oxide has a nanocrystalline structure.

18. The method of claim 17, wherein the nanocrystalline structure has an average grain size of less than about 100 nm.

19. The method of claim 1, further comprising cooling the oxide.

20. The method of claim 19, wherein the oxide is cooled at a rate ranging between about 10° C./min to about 1000° C./min.

21. A nanocrystalline magneto-optical oxide, comprising:
a polycrystalline rare earth oxide composition having an average grain size of less than about 100 nm and a Verdet constant greater than or equal to about 300 rad $T^{-1}$ $m^{-1}$ for light having a wavelength of about 632.8 nm.

22. The nanocrystalline magneto-optical oxide of claim 21, wherein the rare earth oxide comprises at least one of Dy, Tb, and Ho.

23. The nanocrystalline magneto-optical oxide of claim 21, wherein the rare earth oxide comprises holmium oxide ($Ho_2O_3$).

24. The nanocrystalline magneto-optical oxide of claim 21, wherein the rare earth oxide comprises terbium oxide ($Tb_4O_7$).

25. The nanocrystalline magneto-optical oxide of claim 21, wherein the rare earth oxide comprises dysprosium oxide ($Dy_2O_3$).

26. The nanocrystalline magneto-optical oxide of claim 21, wherein the rare earth oxide has an absorption coefficient of less than or equal to about 10.1 $cm^{-1}$ for light having a wavelength of about 632.8 nm.

27. The nanocrystalline magneto-optical oxide of claim 21, wherein the rare earth oxide is substantially transparent to visible light.

28. The nanocrystalline magneto-optical oxide of claim 21, wherein the rare earth oxide comprises a structure having cubic symmetry.

* * * * *